Figure 2:
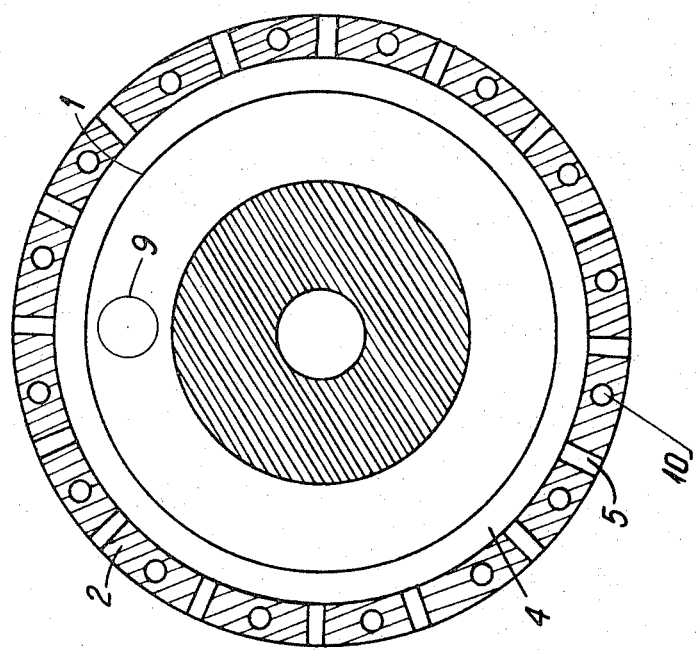

United States Patent [19]
Radev et al.

[11] 3,858,327
[45] Jan. 7, 1975

[54] SELF-CENTERING SIGHTING MARK

[75] Inventors: Hristo Kirilov Radev; Emilia Anguelova Chobanova, both of Sofia, Bulgaria

[73] Assignee: Nauchnoizsledovatelski Sektor pri WMEI "Lenin", Quater Darvenitza, Bulgaria

[22] Filed: Apr. 12, 1972

[21] Appl. No.: 243,166

[30]     Foreign Application Priority Data
    Apr. 16, 1971  Bulgaria.............................. 17359

[52] U.S. Cl.................. 33/286, 33/1 R, 33/DIG. 2, 308/9
[51] Int. Cl. ............................................ G01b 5/25
[58] Field of Search......... 33/1 R, 1 H, 286, DIG. 2; 73/37.8, 37.9; 308/9

[56]         References Cited
        UNITED STATES PATENTS
| | | | |
|---|---|---|---|
| 1,662,836 | 3/1928 | Steinle | 356/153 |
| 2,431,087 | 11/1947 | Subber | 73/37.8 |
| 3,205,587 | 9/1965 | Kilburn | 33/DIG. 2 |
| 3,210,988 | 10/1965 | Knobel | 73/37.9 |
| 3,583,815 | 6/1971 | Kersey | 356/153 |

*Primary Examiner*—William D. Martin, Jr.
*Attorney, Agent, or Firm*—Ladas, Parry, Von Gehr, Goldsmith & Deschamps

[57]         ABSTRACT

A self-centering contactless sighting mark is provided with means for forming an air cushion between the mark and the wall of a cylindrical hole. The center of the circular cross section of the hole can thus be accurately determined without errors due to deviations from regular circular shape.

1 Claim, 2 Drawing Figures

Patented Jan. 7, 1975   3,858,327

SELF-CENTERING SIGHTING MARK

This invention relates to a self-centering sighting mark for measuring the mutual disposition of the axes of cylindrical holes.

Self-centering sighting marks are known, in which the fixing of the center of the circular cross section of cylindrical holes is effected at one setting of the mark by three points of contact, disposed at 120° intervals around said circular cross section.

It is a disadvantage of the known self-centering marks that the position of the center of the circular cross section of cylindrical holes is determined only by three contact points of the checked hole. Furthermore, the precision of fixation of this center is influenced by the deviations from the regular geometric shape, as well as by the variations of the measuring pressure.

It is therefore a general object of the present invention to provide a self-centering sighting mark, which makes it possible to achieve sufficient precision in determining the center of the cross section of the cylindrical hole, so that its precision does not depend on deviations from the regular geometric shape.

This object is achieved by a self-centering sighting mark, which comprises a plug consisting of a body and a pressed-in sleeve, in which diametrically disposed holes are bored, which are connected by a common chamber and longitudinal holes for communication with the atmosphere. The sighting mark on a small plate, is located immovably in the pneumatic plug, which is self-centering by means of an air cushion.

The advantage of a self-centering sighting mark lies in that with an optimum number of holes for an air cushion around the mark, it is possible to determine the average center of the cross section of cylindrical holes without depending on deviations from the normal geometric shape of such cylindrical holes.

Figure 1:
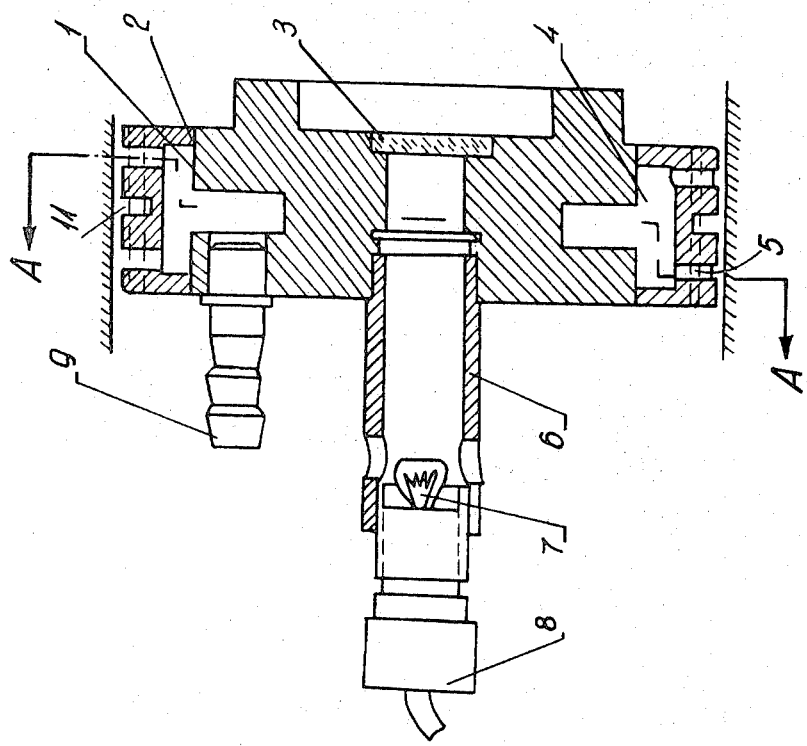

The invention may be better understood when explained with reference to the accompanying drawings, in which there is illustrated a preferred embodiment of the invention. In the drawings:

FIG. 1 is a longitudinal cross-section of the mark;
FIG. 2 is a cross-sectional view along A—A.

The self-centering sighting mark comprises a pneumatic plug, consisting of a body 1 with a pressed-in sleeve 2. Bored in the sleeve are two rows of holes 5 of equal diameter, disposed diametrically at equal spaced distances. The holes 5 are interconnected through the common chamber 4. Fastened immovably to the plug body are the glass plate 3 with the sighting mark, the handle 6 with the holder 8 for the lamp 7, and the pipe connection 9. Bored in the sleeve 2 are the longitudinal holes 10, which provide a connection with atmospheric pressure in the slot 11.

The self-centering of the mark is achieved in the following manner:

Air under constant pressure enters the pipe connection 9 in the chamber 4, from where it flows out through the holes 5 in the atmosphere through the play between the surfaces of the cylindrical hole and the plug, creating thereby an air cushion. The plug rests on this air cushion, whereby the center of the sighting mark coincides with the center of the cross section of the cylindrical hole.

What we claim is:

1. A self-centering sighting mark for determining the axis of a cylindrical hole into which it is inserted, comprising a cylindrical plug having a central axis including a body and a pressed-in sleeve, said sleeve having diametrically disposed holes bored therein, a common connecting chamber for said holes extending between said body and sleeve, longitudinal holes bored in said sleeve for communication with the atmosphere, a sighting mark fixed centrally with respect to the axis of the plug, and means for conducting air under pressure to said chamber whereby air flows through said diametrically disposed holes to provide an air cushion between the plug and the wall of the cylindrical hole.

* * * * *